United States Patent [19]

Sheehan et al.

[11] Patent Number: 4,887,378
[45] Date of Patent: Dec. 19, 1989

[54] FISHING LURE

[75] Inventors: Larry A. Sheehan, Springfield; John R. James, Cassville, both of Mo.

[73] Assignee: Bo-James Co., Inc., Cassville, Mo.

[21] Appl. No.: 178,558

[22] Filed: Apr. 7, 1988

[51] Int. Cl.$^4$ ............................................. A01K 85/00
[52] U.S. Cl. ................................. 43/42.25; 43/42.26; 43/42.4; 43/42.42
[58] Field of Search ................... 43/42.25, 42.39, 42.4, 43/42.41, 42.42, 42.26, 42.27

[56] References Cited

U.S. PATENT DOCUMENTS

| | | | |
|---|---|---|---|
| D. 215,090 | 9/1969 | Bruckner | 43/42.4 |
| 549,842 | 11/1895 | Cable | 43/42.25 |
| 779,083 | 1/1905 | Jamison | 43/42.26 |
| 1,430,626 | 10/1922 | Christensen | |
| 1,773,561 | 8/1930 | Wethall | 43/42.26 |
| 2,164,807 | 7/1939 | Evans | 43/27 |
| 2,165,734 | 7/1939 | Stracener | 43/42.27 |
| 2,624,146 | 1/1953 | Kahle | 43/43.16 |
| 2,782,548 | 2/1957 | Linton | 43/37 |
| 2,817,922 | 12/1957 | Takeshita | 43/42.28 |
| 2,994,151 | 8/1961 | Webb | 43/42.4 |
| 3,023,536 | 3/1962 | Williams | 43/43.2 |
| 3,130,514 | 4/1964 | Cornick | 43/37 |
| 3,605,317 | 9/1971 | Pobst | 43/42.25 |
| 3,690,029 | 9/1972 | Pobst | 43/42.25 |
| 4,060,928 | 12/1977 | Messler et al. | 43/43.16 |
| 4,450,645 | 5/1984 | Ancona | 43/42.25 |
| 4,747,228 | 5/1988 | Giovengo | 43/42.42 |

Primary Examiner—Kurt Rowan
Attorney, Agent, or Firm—Senniger, Powers, Leavitt and Roedel

[57] ABSTRACT

A fishing lure comprising a head, an eye for attaching the head to a fishing line, a substantially planar hook having a shank projecting rearwardly from the head, and a concave butt portion at the rearward end of the shank terminating in a barb, and guide arms on the head. The guide arms function to engage the mouth of a fish when the hook is inside the mouth to rotate the lure to a set position wherein the plane of the hook is substantially perpendicular to the floor and roof of the mouth of the fish, and to maintain the lure in the set position thereby to facilitate embedment of the hook in the floor or roof of the mouth.

4 Claims, 1 Drawing Sheet

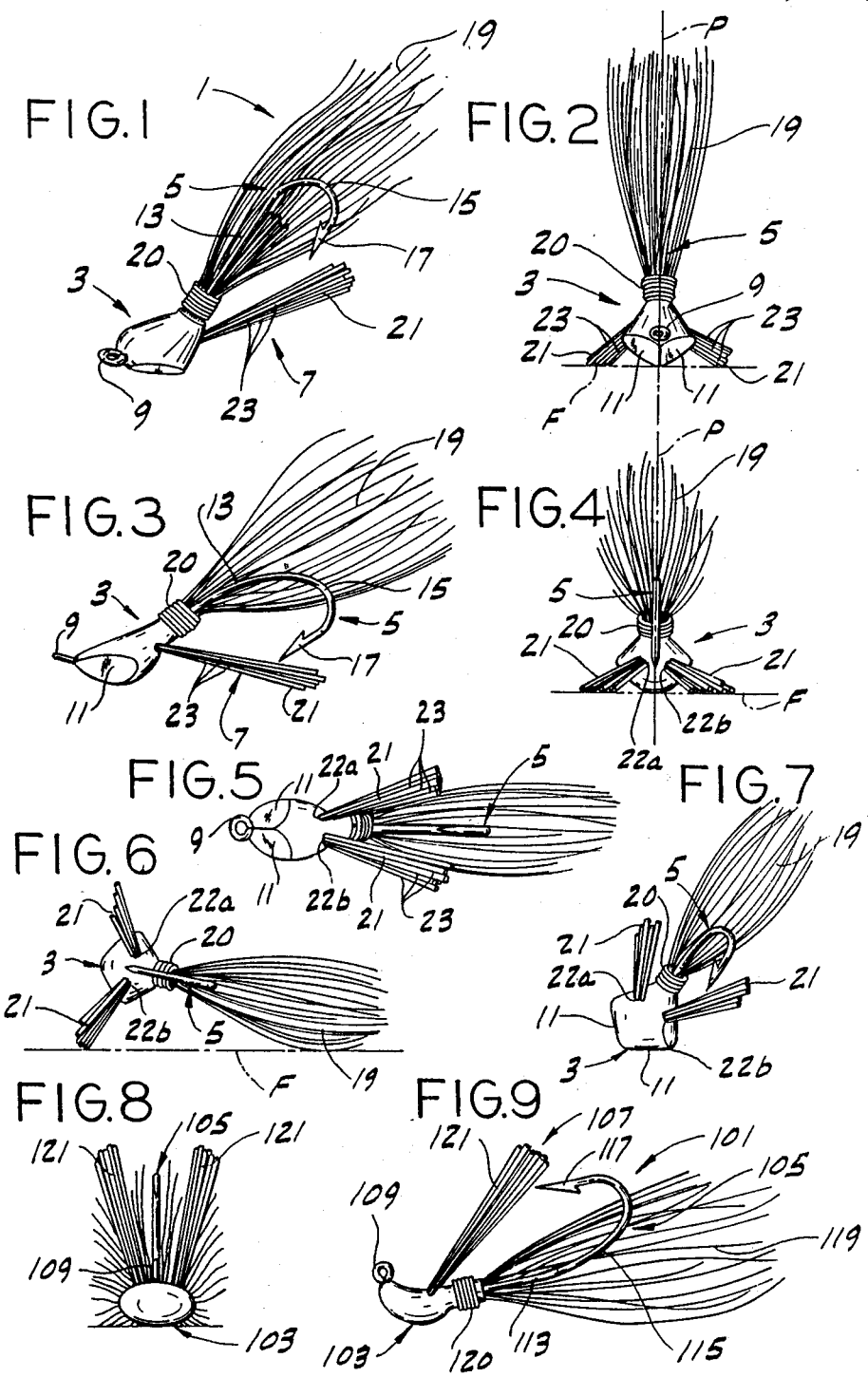

FISHING LURE

BACKGROUND OF THE INVENTION

This invention relates generally to fishing devices and, more particularly, to an improved fishing lure.

A common problem associated with fishing lures having hooks is that, once the lure is inside the fish's mouth, the hook does not become firmly embedded in the mouth, thereby allowing the fish to free itself with little or no effort. This is very frustrating to anglers since the experience, skill and effort required to cause a fish to bite at a lure is undone unless the fish is actually hooked. There is, therefore, a need for a fishing lure having a hook which, once inside the mouth of a fish, will become securely embedded in the floor or roof of the fish's mouth.

Reference may be made to U.S. Pat. Nos. 2,817,922, 3,605,317 and 3,690,029 disclosing fishing lures generally in the field of this invention. It will be noted, however, that such lures do not facilitate embedment of the hook in the floor or roof of a fish's mouth.

SUMMARY OF THE INVENTION

Among the several objects of this invention may be noted the provision of an improved fishing lure which reduces the likelihood of the lure escaping from inside a fish's mouth; the provision of such a lure which facilitates the embedment of the hook in the floor or roof of a fish's mouth; the provision of a such a lure which is attractive to fish and likely to cause them to bite; and the provision of such a lure which is easy to use and economical to manufacture.

Generally, a fishing lure of the present invention comprises a head, means for attaching the head to a fishing line, a substantially planar hook having a shank projecting rearwardly from the head, and a concave butt portion at the rearward end of the shank terminating in a barb, and guide means on the head engageable with the mouth of a fish when the hook is inside the mouth for rotating the lure to a set position wherein the plane of the hook is substantially perpendicular to the floor and roof of the mouth of the fish, and for maintaining the lure in the set position thereby to facilitate embedment of the hook in the floor or roof of the mouth.

Other objects and features will be in part apparent and in part pointed out hereinafter.

BRIEF DESCRIPTION OF THE DRAWINGS

FIG. 1 is a perspective view illustrating a first embodiment of the fishing lure of this invention;

FIG. 2 is a front view of the fishing lure of FIG. 1;

FIG. 3 is a side view of the fishing lure of FIG. 1;

FIG. 4 is a rear view of the fishing lure of FIG. 1;

FIG. 5 is a bottom plan view of the fishing lure of FIG. 1;

FIG. 6 is a rear view of the fishing lure of FIG. 1 illustrating engagement of a guide arm with the mouth of a fish;

FIG. 7 is a rear view of the fishing lure of FIG. 1;

FIG. 8 is a front view of a second embodiment of the fishing lure of the present invention; and FIG. 9 is a side view of the fishing lure of FIG. 8.

Corresponding reference characters indicate corresponding parts throughout the several views of the drawings.

DESCRIPTION OF THE PREFERRED EMBODIMENT

Referring to the drawings, particularly FIG. 1, a fishing lure of the present invention is designated in its entirety by the reference numeral 1. As illustrated, the fishing lure generally comprises a head, generally designated 3, a substantially planar hook, generally designated 5, and guide means, generally designated 7, attached to the head. The lure is especially adapted to assume a "set" position inside the mouth of a fish wherein the plane P of the hook 5 is substantially perpendicular to the floor and roof of the mouth to facilitate embedment of the hook 5 in the floor or roof as illustrated in FIGS. 2 and 4.

The head 3 of the fishing lure is generally oblong in shape and constructed of lead or the like to constitute a weight. Mounted on the top, forward portion of the head 3 generally in the plane P of the hook 5 is an eye 9 for attaching the head 3 to a fishing line. The bottom, forward portion of the head 3 has a pair of flat camming surfaces 11 generally symmetric about the plane P of the hook 5 and inclined at a forty-five degree angle with respect to the plane of the hook as illustrated in FIGS. 2, 3 and 5. The surfaces 11 may be formed on the head 3 by molding, machining or other suitable process.

The hook 5 comprises a generally straight shank 13 projecting rearwardly from the tail end of the head 3 and a concave butt portion 15 bent from the rearward end of the shank to curve downward and forward from the shank and terminating in a barb 17. Additional barbs may be placed on the butt portion or the shank to make escape of the hook 5 from the mouth of a fish more difficult. A tail of fibrous material 19 or the like extends from the rear of the head 3 and is bound to the shank adjacent the head by wire, string or the like 20. The tail 19 substantially encompasses the hook 5 to mask the hook and attract fish thereto. Other types of artificial bait may be used as long as they do not interfere with the function of the guide means, as will be described hereinafter.

The guide means 7 comprises a pair of guide arms 21 extending from separate points 22a, 22b on the head 3 generally rearwardly and downwardly toward the barb 17 on opposite sides of the plane of the hook 5 as illustrated in FIGS. 3 and 5. The guide arms 21 are generally symmetric about the plane of the hook 5 and diverge in the direction away from the head 3. Each of the arms 21 comprises a bunch of bristles 23 attached at one of their ends to the head 3 at points 22a, 22b. The bristles 23 are relatively stiff and sufficiently long that they extend down beyond the barb 17 to shield the butt portion 15 of the hook and barb 17 from weeds and the like, thereby reducing the likelihood of the hook 5 snagging on such objects. The bristles 23 are also sufficiently pliable to deflect upward to permit embedment of the hook 5 in the roof or floor of a fish's mouth, as will be described hereinafter. Single member guide arms having the necessary stiffness and pliability may also be used.

When in the water, the lure of FIGS. 1–7 will normally assume a position where the hook points generally downwardly. However, when a fish bites at the lure and takes the lure into its mouth, the lure may initially be oriented so that the hook 5 is not in the preferred "set" position, that is, a position wherein the plane of the hook is generally perpendicular to the floor and roof of the mouth of the fish to ensure secure embedment of the barb 17 in either the floor or the roof of the mouth. The function of the guide arms 21 is to engage the mouth of the fish, causing the lure to rotate to the stated set position, and then to maintain the lure in the set position until the fish is properly hooked. For example, FIG. 6 illustrates the lure as it may initially enter the mouth of a fish in a position wherein only one guide arm engages the floor F of the mouth and the hook is oriented generally parallel to the roof and floor of the mouth. The lure is relatively unstable in this position and will tend to rotate toward its preferred set position in which the lure is stably supported by the engagement of both guide arms with the floor of the mouth. Referring to FIG. 7, rotation of the lure toward its set position is further assisted by the engagement of the camming surfaces 11 with the closed lips of the fish as the lure moves forward in the mouth of the fish, as will happen when the lure is pulled as the fish attempts to swim away from the line.

Once the lure is in its set position, the guide arms in engagement with the floor F of the mouth of the fish will maintain the lure in its set position, as illustrated in FIGS. 2 and 4. Both the divergence of the guide arms 21 away from the head 3 and the flaring of each bunch of bristles 23 away from the head 3 provides a relatively wide support base which resists rotation of the lure 1 away from the set position. When the lure is in the set position, the barb 17 is adjacent the floor F of the mouth as illustrated in FIG. 4. Closure by the fish of its mouth with the lure 1 in the set position will cause the bristles 23 to deflect upward and the hook 5 to become embedded in the soft tissue in the floor of the mouth, thus greatly reducing the likelihood of the fish freeing itself from the lure.

A modified fishing lure generally designated 101 is shown in FIGS. 8 and 9. Similar parts are identified by the same reference numerals with the addition of the prefix 100. The fishing lure 101 is generally similar to that described above in that it includes a head 103, a substantially planar hook 105 and guide means generally designated 107. The head 103 in the modified embodiment has the same construction as in the first embodiment including an eye 109 on the top surface in the plane of the hook 105, two inclined camming surfaces (not shown) on the bottom, forward portion of the head, and fibrous material 119 trailing from the tail end of the head and bound to the shank by wire, string or the like 120.

The hook 105 extends from the rear of the head and generally comprises a straight shank 113, and a concave butt portion 115 which curves upward and forward from the shank 113 and terminates in a barb 117 as illustrated in FIG. 9. As in the first embodiment, the guide means 107 comprises a pair of guide arms 121 extending from separate points on the head 103 generally toward the barb 117 on opposite sides of the plane of the hook 105. The guide arms 121 are generally symmetric about the plane of the hook 105 and diverge in the rearward direction away from the head 103. In this embodiment, though, the guide arms 121 extend up beyond the barb 117. The construction of the guide arms 121 is the same as in the first embodiment.

The modified lure 101 enters the mouth of the fish in a manner similar to that described in the first embodiment. The guide arms 121 facilitate rotation of the lure 101 to the stated set position with the camming surfaces providing assistance as described in the first embodiment. In the set position, both of the guide arms 121 engage the roof or floor of the mouth with the barb 117 adjacent thereto. Closure of the mouth by the fish causes the guide arms 121 to deflect downward and the hook 105 to become embedded in the roof or floor of the fish's mouth.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense. For example, it will be understood that while the lure 1 is illustrated in the drawings as having two inclined camming surfaces 11 generally symmetric about the plane P of the hook 5, one camming surface may suffice. Moreover, the angle of inclination of each camming surface 11 may vary from 45°, and the camming surfaces (if there is more than one) do not have to be symmetrically arranged. With respect to the guide arms 21, the length and construction of these arms may also vary from what is shown in the drawings. While it is preferable that the guide arms be relatively long to prevent snagging of the hook, they may be short (e.g., one-quarter inch) and still accomplish their primary function, which is to rotate the hook to the stated set position and to maintain the hook in that position.

It will also be understood that the term "lure" as used herein includes spinner baits, jigs and other fish hook designs.

What is claimed is:

1. A fishing lure comprising a head, means for attaching the head to a fishing line, a substantially planar hook having a shank projecting rearwardly from said head and a concave butt portion at the rearward end of the shank terminating in a barb, guide means on the head engageable with the mouth of a fish when the hook is inside the mouth for rotating the lure to a set position wherein the plane of the hook is substantially perpendicular to the floor and roof of the mouth of the fish and for maintaining the lure in said set position thereby to facilitate embedment of said hook in the floor or roof of the mouth, and camming means associated with said head engageable with the closed lips of a fish for assisting in rotation of the lure to said set position, said camming means comprising a pair of substantially flat camming surfaces located on the bottom, forward portion of said head generally symmetric about the plane of said hook and lying in planes inclined with respect to the plane of the hook, said camming surfaces being engageable with the closed lips of a fish as the lure moves forwardly in the mouth of the fish to rotate the lure toward said set position.

2. The fishing lure of claim 1 wherein said camming surfaces are inclined at about a forty-five degree angle with respect to the plane of the hook.

3. A fishing lure comprising a head, means for attaching said head to a fishing line, a substantially planar hook having a shank projecting rearwardly from said head and a concave butt portion at the rearward end of the shank terminating in a barb, and camming means associated with said head engageable with the closed lips of a fish to facilitate rotation of the lure toward a set position wherein the plane of the hook is substantially perpendicular to the floor and roof of the mouth of the fish thereby to facilitate embedment of said hook in the floor or roof of the mouth, said camming means comprising a pair of substantially flat camming surfaces located on the bottom, forward portion of said head generally symmetric about the plane of said hook and lying in planes inclined with respect to the plane of the hook, said camming surfaces being engageable with the closed lips of a fish as the lure moves forwardly in the mouth of the fish to rotate the lure toward said set position.

4. The fishing lure of claim 3 wherein said camming surfaces are inclined at about a forty-five degree angle with respect to the plane of the hook.

* * * * *